United States Patent [19]

Kaszas et al.

[11] Patent Number: 5,276,094
[45] Date of Patent: Jan. 4, 1994

[54] COMPOSITIONS OF BUTYL ELASTOMERS AND BLOCK COPOLYMERS OF POLYISOBUTYLENE

[75] Inventors: Gabor Kaszas; Judit E. Puskas, both of Corunna, Canada

[73] Assignee: Polysar Rubber Corp., Ontario, Canada

[21] Appl. No.: 974,552

[22] Filed: Nov. 12, 1992

[51] Int. Cl.$^5$ .................. C08L 53/00; C08F 297/00
[52] U.S. Cl. .......................... 525/95; 525/88; 525/191; 525/241; 525/244; 525/249; 525/270; 525/314; 525/319; 525/332.3; 525/359.1; 525/371
[58] Field of Search ............ 525/95, 88, 314, 244, 525/249, 319

[56] References Cited

U.S. PATENT DOCUMENTS

| | | | |
|---|---|---|---|
| 3,686,364 | 8/1972 | Robinson et al. | 525/98 |
| 4,262,095 | 4/1981 | Giusti | 525/249 |
| 4,810,752 | 3/1989 | Bayan | 525/98 |
| 4,881,996 | 11/1989 | Nussbaum et al. | 525/96 |
| 4,897,137 | 1/1990 | Miller et al. | 525/96 |
| 4,910,261 | 3/1990 | Kaszas et al. | 525/314 |
| 4,943,616 | 7/1990 | Mishra et al. | 525/314 |

Primary Examiner—James J. Seidleck
Assistant Examiner—M. L. Warzel
Attorney, Agent, or Firm—Joseph C. Gil; Godfried R. Akorli

[57] ABSTRACT

An elastomeric polymer composition that exhibits improved processability and green strength comprises: from about 95 to about 70 parts by weight of one rubbery polymer selected from the group consisting of butyl rubber, chlorinated butyl rubber and brominated butyl rubber and from about 5 to about 30 parts by weight of a block copolymer having an elastomeric polyisobutylene midblock and two plastomeric endblocks of polymerized monovinylidene aromatic monomers and star-shaped block copolymers having from three to six arms wherein the inner elastomeric blocks are polyisobutylene and the outer plastomeric blocs are polymerized monovinylidene aromatic monmers for a total of 100 parts by weight of the rubbery polymer and the block copolymer. Vulcanizates of the composition that exhibit reduced permeability to gases and improved tear strength are provided together with a process for their production.

10 Claims, No Drawings

COMPOSITIONS OF BUTYL ELASTOMERS AND BLOCK COPOLYMERS OF POLYISOBUTYLENE

FIELD OF INVENTION

This invention relates to synthetic rubber compositions and a process for producing vulcanizates thereof. More particularly, the invention relates to elastomeric compositions comprising mixtures of butyl-type elastomeric polymers and block copolymers of polyisobutylene and polymerized aromatic monomers that exhibit improved processability and green strength, and a process for producing vulcanizates thereof, for use in articles requiring low or reduced permeability to gases and improved tear strength.

BACKGROUND OF INVENTION

Butyl elastomeric polymers have been known and commercially available for many years. They possess a variety of inherently satisfactory properties as elastomers which has enabled them to find utility in many commercial uses. Among their satisfactory inherent properties are their impermeability to air, high damping of low frequency vibrations, and good resistance to aging, heat, acids, bases, ozone and other chemicals after vulcanization, which renders them well suited for use in a variety of applications including articles requiring low or reduced permeability to air. Examples of such articles include, but are not limited to, tire inner tubes, tire curing bladders and various air bladders.

Halogenated butyl elastomeric polymers have also been known and commercially available for many years. In addition to possessing the satisfactory inherent properties of butyl elastomeric polymers described above, halogenated butyl elastomeric polymers also possess cure compatibility with more highly unsaturated rubbers and good adhesion to such other rubbers after vulcanization, which renders them well suited for use in pneumatic tire inner liners. In the tire industry's continuing quest for improved inner liners, an elastomeric compound which exhibits both an improvement in processability and green strength and, after vulcanization, an improvement in air impermeability and tear strength over conventional inner liners would be desirable, provided that these improvements also resulted in the maintenance of a high level of strength and adhesive properties.

DESCRIPTION OF PRIOR ART

U.S. Pat. No. 4,897,137 (Miller et al) discloses a primer composition for use on EPDM roofing materials in conjunction with polychloroprene based roofing adhesives that comprises a mixture of 100 parts styrene-ethylene-butylene-styrene block copolymer rubber, from 10 to 1000 parts brominated isobutylene-isoprene butyl rubber polymer, from 10 to 1000 parts aromatic hydrocarbon reinforcing resin selected from the group consisting of hydrogenated alicyclic hydrocarbons, linear homopolymers of alpha methylstyrene and copolymers of styrene or alpha methylstyrene with vinyl toluene monomer or butadiene monomer and mixtures thereof and sufficient solvent to achieve application viscosity.

U.S. Pat. No. 4,881,996 (Nussbaum et al) discloses a method of splicing unprimed, cured elastomeric substrates together that comprises the steps of:

(I) applying to the elastomeric substrates an adhesive coating composition consisting of:
 (a) halogenated pre-crosslinked isobutylene-isoprene copolymer rubber,
 (b) thermoplastic copolymer selected from the group consisting of styrene-butadiene-styrene, styrene-isoprene-styrene, styrene-ethylene-butylene-styrene and styrene-ethylene-propylene-styrene polymers,
 (c) a hydrocarbon resin selected from the group consisting of thermoplastic hydrocarbon resin, terpene phenol polymer resin and polymerized pentaerythritol rosin ester,
 (d) quinoid cure mixture comprising a metal catalyst complex oxidizing agent and a quinoid cross-linking agent, and
 (e) solvent, said adhesive composition being storage stable in a closed container for at least six months,
(II) drying said coated substrates, and
(III) joining said dried, coated substrates.

U.S. Pat. No. 4,810,752 (Bayan) discloses a thermoplastic elastomer comprising a halobutyl rubber cured by dynamic vulcanization with a multifunctional amine curing agent such as a carbon dioxide hindered diamine, the cure being effected in the presence of at least 20 parts of a mixture formed from 10 to 60 parts of a polyolefin and 1 to 90 parts of a thermoplastic elastomer selected from the group consisting of polyesters and block copolymers having terminal polystyrene units and olefin elastomeric mid block units such as styrene-ethylene-butylene-styrene block copolymers, said parts based on 100 parts of said rubber.

SUMMARY OF THE INVENTION

It is an objective of this invention to provide a new rubber composition having improved processability characteristics and green strength, which composition, after vulcanization, possesses very low permeability to gases and improved tear strength, while also maintaining a high level of strength and adhesive properties and reduced susceptibility to cut growth.

It is a further objective of this invention to provide a process for producing a rubber vulcanizate having reduced permeability to gases and improved tear strength.

Accordingly, in one aspect our invention provides an elastomeric polymer composition that has improved processability and green strength comprising from about 95 to about 70 parts by weight of one rubbery polymer selected from the group consisting of butyl rubber, chlorinated butyl rubber and brominated butyl rubber, and from about 5 to about 30 parts by weight of a block copolymer selected from the group consisting of linear triblock copolymers wherein the elastomeric midblock is polyisobutylene with a number average molecular weight of from about 10,000 to about 200,000 and a molecular weight distribution of from about 1.05 to about 1.6 and the two plastomeric endblocks are polymers of at least one $C_8$ to $C_{12}$ monovinylidene aromatic monomer which may be substituted with at least one $C_1$ to $C_4$ alkyl group or a chlorine or bromine atom on the aromatic ring comprising from about 5 to about 50 weight percent of the linear triblock copolymer and star-shaped block copolymers having from three to six arms wherein the inner elastomeric blocks are polyisobutylene with a number average molecular weight of from about 10,000 to about 200,000 and the outer plastomeric blocks are polymers of at least one $C_8$ to $C_{12}$ monovinylidene aromatic monomer which may be substituted with at least one $C_1$ to $C_4$ alkyl group or a chlorine or bromine atom on the aromatic ring comprising from about 10 to about 55 weight percent of the star-shaped block copolymer, for a total of 100 parts by weight of the rubbery polymer and the block copolymer.

In another aspect, our invention provides a process for producing a vulcanizate having reduced permeability to gases and improved tear strength which comprises:

(A) mixing from about 95 to about 70 parts by weight of one rubbery polymer selected from the group consisting of butyl rubber, chlorinated butyl rubber and brominated butyl rubber with from about 5 to about 30 parts by weight of a block copolymer selected from the group consisting of linear triblock copolymers wherein the elastomeric midblock is polyisobutylene with a number average molecular weight of from about 10,000 to about 200,000 and a molecular weight of from about 1.05 to about 1.6 and the two plastomeric endblocks are polymers of at least one $C_8$ to $C_{12}$ monovinylidene aromatic monomer which may be substituted with at least one $C_1$ to $C_4$ alkyl group or a chlorine or bromine atom on the aromatic ring comprising from about 5 to about 50 weight percent of the linear triblock copolymer and star-shaped block copolymers having from three to six arms wherein the inner elastomeric blocks are polyisobutylene with a number average molecular weight of from about 10,000 to about 200,000 and the outer plastomeric blocks are polymers of at least one $C_8$ to $C_{12}$ monovinylidene aromatic monomer which may be substituted with at least one $C_1$ to $C_4$ alkyl group or a chlorine or bromine atom on the aromatic ring comprising from about 10 to about 55 weight percent of the star-shaped block copolymer, for a total of 100 parts by weight of the rubbery polymer and the block copolymer, from about 30 to about 90 parts by weight of at least one carbon black, and cure active agents, (B) forming the mixture produced in (A) into a sheet, and (C) vulcanizing the sheet formed in (B) at a temperature of from about 150° C. to about 200° C. for from about 5 to about 60 minutes.

DETAILED DESCRIPTION OF THE INVENTION

Butyl rubber is well known in the art and is a polymer of a $C_4$ to $C_6$ isoolefin, preferably isobutylene, and a $C_4$ to $C_8$ conjugated diolefin, preferably isoprene. A preferred butyl polymer contains from about 97 to 99.5 weight percent of isobutylene and from about 0.5 to about 3 weight percent of isoprene. Butyl rubber typically has a molecular weight expressed as the Mooney (ML1+8 at 125° C.), of from about 25 to about 65, preferably from about 40 to about 60.

Halogenated butyl rubber is well known in the art and can be either bromobutyl or chlorobutyl rubber; it is produced by the bromination or chlorination of butyl rubber. Bromobutyl rubber typically contains from about 1 to 3, preferably from about 1 to about 2, weight percent of isoprene and from about 97 to about 99, preferably from about 98 to about 99, weight percent of isobutylene, based on the hydrocarbon content of the rubber, and from about 1 to about 4, preferably from about 1.5 to about 3, weight percent of bromine, based on the bromobutyl rubber. A typical bromobutyl rubber has a molecular weight, expressed as the Mooney viscosity (ML1+8 at 125° C.) of from about 25 to about 55. Chlorobutyl rubber typically contains from about 1 to about 3, preferably from about 1 to about 2, weight percent of isoprene and from about 97 to about 99, preferably from about 98 to about 99, weight percent of isobutylene, based on the hydrocarbon content of the rubber and from about 0.5 to about 2.5, preferably from about 0.75 to about 1.75, weight percent of chlorine, based on the chlorobutyl rubber. A typical chlorobutyl rubber has a molecular weight expressed as the Mooney viscosity (ML1+8 at 125° C.) of from about 35 to about 55.

The linear triblock copolymers having an elastomeric polyisobutylene midblock and two plastomeric endblocks of polymerized monovinylidene aromatic monomers and the star-shaped block copolymers having from three to six arms wherein the inner elastomeric blocks are polyisobutylene and the outer plastomeric blocks are polymerized monovinylidene aromatic monomers are prepared by a two-step polymerization process wherein in the first phase a living polyisobutylene block of the desired molecular weight, functionality and a molecular weight distribution of the order of 1.6 or less is formed at a temperature of from about −90° C. to about −10° C., preferably from about −80° C. to about −40° C., and in the second phase the monovinylidene aromatic monomer is polymerized on to said living polyisobutylene block to form the polymerized monovinylidene aromatic monomer blocks.

The polyisobutylene block is prepared by carrying out the polymerization of the isobutylene in the presence of a polymerization initiator complex prepared in a solvent system using procedures found to minimize decomposition of the active centres of the complex as well as side reactions which lead to the formation of undesirable products. The initiator complexes employed comprise initiator components having the formula

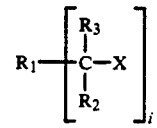

in which $R_1$, $R_2$ and $R_3$ are alkyl, aryl or aralkyl groups usually of 1 to about 20 and preferably 1 to 8 carbon atoms and can be the same or different and X is a carboxyl, an alkoxyl, a peroxide, a hydroperoxide, a peroxy ester, a halogen or a hydroxyl group and i a positive whole number from 2 to 6, in combination with various Lewis acids of the general formula $MX_n$ in which M is titanium, aluminum, boron, tin, vanadium or antimony X is a halogen and n is a positive whole number corresponding to the valence of the metal M.

The functionality of the initiator component used for the preparation of the living polyisobutylene block depends on the desired structure of the final product, for example, for the preparation of a linear triblock copolymers difunctional initiators should be used, while for the preparation of a star-shaped block copolymer initiator components having a functionality of three to six should be used. As used herein "functionality" is meant to refer to the number of active sites of the initiator component capable of initiating living isobutylene polymerization upon the addition of the initiator, the Lewis acid.

Illustrative non-limiting examples of suitable initiator components include 1,4-di(2-methoxy-2-propyl) benzene, 1,4-di(2-chloro-2-propyl) benzene, 2,6-dichloro-2,4,4,6-tetramethylheptane, 1,4-di(2-hydroxyl-2-propyl)benzene, 2,6-dihydroxyl-2,4,4,6-tetramethylheptane, 2,5-dimethyl-2,5-di(t-butylperoxy) hexane, 2,5-dimethyl-2,5-di(t-butylperoxy) hexyne-3, 2,5-di(hydroperoxy)-2,5-dimethylhexane, 2,7-di(hydroperoxy)-2,7-dimethyloctane, 1,4-di(2-hydroperoxide-2-propyl)-benzene and 2,5-dimethyl-2,5-bis(benzoyl peroxyhexane).

The Lewis acids suitable for use with the initiator components include boron trichloride, aluminum trichloride, titanium tetrachloride and stannic tetrachloride, titanium tetrachloride being preferred.

Initiation induced by protic impurities (traces of moisture) present in the system can lead to the formation of homopolymers. This homopolymerization, however, can be prevented by the addition of well known proton scavengers such as 2,6-di-tert-butyl pyridine, 4-methyl-2,6-di-tert-butyl pyridine, 1,8-bis(dimethylamino) naphthalene and diisopropylethylamine prior to the first stage of the polymerization.

Molecular weight control of the living polyisobutylene midblock can be accomplished merely by adjusting the relative amounts of the isobutylene and initiator present in the reaction mixture. The polyisobutylene will continue to grow as long as there is isobutylene available for reaction. The linear block copolymers used in the present invention have a polyisobutylene midblock with a number average molecular weight of from about 10,000 to about 200,000, preferably of from about 35,000 to about 100,000 and a molecular weight distribution of from about 1.05 to about 1.6. The star-shaped block copolymers used in the present invention have inner polyisobutylene blocks with a number average molecular weight of from about 10,000 to about 200,000, preferably of from about 35,000 to about 100,000.

The solvent or solvent mixture used in the polymerization process should be such that (1) the polyisobutylene and the final block copolymer remain in solution and (2) the solvent medium has some degree of polarity in order for the polymerization to proceed at a reasonable rate. Thus in order to fulfil this complex requirement a mixture of nonpolar and polar solvents is preferred. Suitable nonpolar solvents include aromatic hydrocarbons, such as toluene, cyclic hydrocarbons such as cyclopentane, methylcyclohexane and mixtures thereof. Appropriate polar solvents include halogenated hydrocarbons such as ethyl chloride, methylene chloride, methyl chloride, n-butyl chloride and chlorobenzene. Especially preferred is a mixture of cyclopentane or methylcyclohexane with methyl chloride or methylene chloride. To achieve suitable polarity and solubility, it has been found that the ratio of the nonpolar solvent to the polar solvent on a volume basis should be from about 80:20 to about 40:60, preferably about 60:40.

An electron pair donor that has an electron donor number of at least 15 to no more than about 50 must be added to the reaction mixture prior to the second stage in order that the blocking efficiency is improved and side reactions (such as intra or intermolecular alkylation) are prevented. The electron donor number is defined as the molar enthalpy value for the reaction of the electron donor with $SbCl_5$ as a reference acceptor in a $10^3 M$ solution of dichloroethane and is a measure of the tendency of the electron donor to share its electrons with the acceptor. Some typical electron donors and their donor acceptor number are tabulated by Viktor Gutman in "The Donor-Acceptor Approach to Molecular Interactions", Plenum Press (1978). Electron pair donors suitable for use in the polymerization process include ethyl acetate, dimethyl acetamide, dimethyl formamide, dimethyl sulfoxide, hexamethyl phosphoric triamide, N-methyl-2-pyrrolidinone, pyridine, acetone and methylethylketone. The amount of the electron pair donor used relative to the amount of the initiator component and relative to the amount of the Lewis acid is important. For, if too large an amount of the electron pair donor is used, the polymerization process will be slowed down markedly or will be terminated far below quantitative conversion and if too small an amount of the electron pair donor is used, there will be little or no improvement in the blocking efficiency. The ratio of the electron pair donor to the initiator component is from about 1:10 to about 1:1, preferably from about 1:2 to about 1:1, while the ratio of the initiator component plus the electron pair donor to the Lewis acid should be less than about 1:1, preferably less than about 1:8.

The addition of the external electron pair donor is followed by the addition of the second monomer selected from the group consisting of $C_8$ to $C_{12}$ monovinylidene aromatic monomers which may be substituted with at least one $C_1$ to $C_4$ alkyl group or a chlorine or bromine atom on the aromatic ring or mixtures thereof. Illustrative non-limiting examples of monomers suitable for the synthesis of the end blocks of the linear triblock copolymers and the star-shaped block copolymers having from three to six arms are styrene, p-methylstyrene, p-tert-butylstyrene, p-chlorostyrene, indene, 6-methylindene, 5,7-dimethyl indene, 4,6,7-trimethyl indene and mixtures thereof, styrene being preferred.

Formation of the endblocks at the polyisobutylene termini commences immediately upon addition of the monovinylidene aromatic monomer or the mixture of monovinylidene aromatic monomers to the reaction mixture containing the di- or multifunctional polyisobutylene cations. When the desired product has been formed, the reaction is terminated by the addition of a nucleophilic terminating agent such as methanol, ethanol, pyridine, ammonia, an alkyl amine or water.

As is normally the case, the product molecular weights are determined by reaction time, temperature, concentration, the nature of the reactants and other factors. Consequently, different reaction conditions will produce different products. Synthesis of the desired reaction product is thus achieved through the taking of samples periodically during the course of the reaction for examination.

The block copolymers may be recovered by conventional techniques used to recover rubbery polymers. Such techniques include contacting the polymer-diluent solution or slurry with copious amounts of hot water thereby flashing off the diluent and any unreacted monomers. The polymer—hot water slurry may then be passed over a screen or filter to recover the polymer which may be passed through a tunnel dryer or extruder. Alternatively the block copolymers may be coagulated with alcohol or an alcohol/acetone solution and subsequently recovered and dried.

The linear triblock copolymers for use in the present invention comprise an elastomeric midblock of polyisobutylene with a number average molecular weight of from about 10,000 to about 200,000 and a molecular weight distribution of from about 1.05 to about 1.6 and two plastomeric endblocks of at least one polymerized $C_8$ to $C_{12}$ monovinylidene aromatic monomer which may bear at least one $C_1$ to $C_4$ alkyl substituent or a bromine or chlorine atom on the aromatic ring comprising from about 5 to about 50 weight percent of a total of 100 weight percent of the linear triblock copolymer. Preferably the linear triblock copolymers comprise an elastomeric midblock of polyisobutylene having a number average molecular weight of from about 35,000 to about 100,000 and a molecular weight distribution of from about 1.05 to about 1.6 and two plastomeric endbocks of polystyrene comprising from about 5 to about 50 weight percent of a total of 100 weight percent of the linear triblock copolymer.

The star-shaped block copolymers having from three to six arms for use in the present invention comprise inner elastomeric blocks of polyisobutylene with a number average molecular weight of from about 10,000 to about 200,000 and outer plastomeric blocks of at least one polymerized $C_8$ to $C_{12}$ monovinylidene aromatic monomer which may bear at least one $C_1$ to $C_4$ alkyl substituent or a bromine or chlorine atom on the aromatic ring comprising from about 10 to about 55 weight percent of a total of 100 weight percent of the star-shaped block copolymer. Preferably the star-shaped block copolymers have three arms that comprise inner elastomeric blocks of polyisobutylene with a number average molecular weight of from about 35,000 to about 100,000 and outer plastomeric blocks of polystyrene comprising from about 10 to about 55 weight percent of a total of 100 weight percent of the star-shaped block copolymer.

In preferred embodiments of the present invention a rubber composition comprises: from about 95 to about 70 parts by weight of one rubbery polymer selected from the group consisting of butyl rubber, chlorinated butyl rubber and brominated butyl rubber, and from about 5 to about 30 parts by weight of a block copolymer selected from the group consisting of linear triblock copolymers wherein the elastomeric midblock is polyisobutylene with a number average molecular weight of from about 10,000 to about 200,000 and a molecular weight distribution of from about 1.05 to about 1.6 and the two plastomeric endblocks are polystyrene comprising from about 5 to about 50 weight percent of a total of 100 weight percent of the linear triblock copolymer and star-shaped block copolymers having from three to six arms wherein the inner elastomeric blocks are polyisobutylene with a number average molecular weight of from about 10,000 to about 200,000 and the outer plastomeric blocks are polystyrene comprising from about 10 to about 55 weight percent of a total of 100 weight percent of the star-shaped block copolymer. Such a composition exhibits an improvement in processability characteristics which include extrudability, reduced die swell and increased green strength.

The use of carbon blacks is well known in the art for reinforcement of vulcanizates and results in improved strength properties of the final vulcanizate. Suitable carbon blacks for practising this invention are the well known furnace and channel, preferably furnace, blacks and are used in amounts of from about 30 to about 90, preferably from about 50 to about 70, parts by weight.

The curing system suitable for use in the present invention is not particularly restricted. A typical curing system comprises: (i) a metal oxide, (ii) elemental sulphur and (iii) at least one sulphur based accelerator. A suitable metal oxide is zinc oxide which is used in amounts of from about 1 to about 10, preferably from about 2 to about 5, parts by weight. Elemental sulphur, comprising component (ii) of said curing system is used in amounts of from about 0.2 to about 2 parts by weight. Suitable sulphur based accelerators [component (iii) of said curing system] are used in amounts of from about 0.5 to about 3 parts by weight and may be selected from the thiuram sulphides such as tetramethyl thiuram disulphide (TMTD), the thiocarbamates such as zinc dimethyl dithiocarbamate (ZDC) and the thiazyl and benzothiazyl compounds such as mercaptobenzothiazyl disulphide (MBTS). Preferably the sulphur based accelerator is tetramethyl thiuram disulphide. When the rubbery polymer used in the present invention is brominated butyl rubber or chlorinated butyl rubber, it is possible to use the metal oxide alone as the curing system.

Stabilizers, antioxidants, tackifiers and extender oil, preferably paraffinic oil, may also be added in the usual way and in the normal amounts for compounding butyl-type rubbery polymers.

The procedure of mixing the various components of this invention is not specifically restricted. In one embodiment, all of the ingredients of the rubber composition may be mechanically mixed at an initial temperature of not more than about 80° C. in an internal mixer and then vulcanized in a conventional manner. In another embodiment the rubbery polymer and the block copolymer may be solution blended, the blend recovered from solution prior to being mechanically mixed with the remaining ingredients and then vulcanized in a conventional manner. Thus a blend of a rubbery polymer and the linear triblock copolymer or star-shaped block copolymer having from three to six arms is suitably achieved using solutions of the polymers in mutually compatible hydrocarbon liquid solvents. Such a blend may be recovered from solution by standard recovery techniques of solvent removal and drying, followed by the compounding and vulcanization procedure described above. In yet another embodiment, the linear block copolymer or star-shaped block copolymer having from three to six arms may be added, in bulk, to the rubbery polymer prior to the compounding operation, such as to the rubbery polymer during a final stage of the manufacturing process.

Generally, it is preferred to carry out the compounding procedure in two stages. In the first stage the polymers may be mixed with conventional compounding ingredients; these may include carbon black, tackifers, stabilizers, processing acids and antioxidants. In the second stage of the compounding procedure, the cure active agents are preferably added to the compound described above on a rubber mill or in an internal mixer operated at a temperature normally not in excess of about 60° C. The cure active agents may include elemental sulphur, accelerators and zinc oxide or zinc oxide alone.

After vulcanization, the rubber compositions exhibit a marked improvement in air impermeability and improved tear strength and reduced susceptibility to cut growth while maintaining a desirable balance of other physical properties. By an improvement in air impermeability is meant a reduction in the volume of air that passes through a unit area of defined thickness of the vulcanizate per unit of time. By physical properties is meant hardness, elongation, adhesion and strength properties which include modulus at 100 percent elongation, modulus at 300 percent elongation and tensile strength at rupture. Accordingly, said vulcanizates are suitable for use in articles requiring low or reduced permeability to gases and improved tear strength while maintaining a desirable balance of other physical properties.

In preferred embodiments of the present invention, a rubber composition comprises: from about 95 to about 70 parts by weight of one rubbery polymer selected from the group consisting of butyl rubber, chlorinated butyl rubber and brominated butyl rubber, more preferably from about 95 to about 70 parts by weight of brominated butyl rubber, from about 5 to about 30 parts by weight of a block copolymer selected from the group consisting of linear triblock copolymers wherein the elastomeric polyisobutylene midblock has a number average molecular weight of from about 10,000 to about 200,000 and a molecular weight distribution of from about 1.05 to about 1.6 and the two plastomeric endblocks of polystyrene comprising from about 5 to about 50 weight percent of a total of 100 weight percent of the linear triblock copolymer and star-shaped block copolymers having from three to six arms comprising inner elastomeric blocks of polyisobutylene having a number average molecular weight of from about 10,000 to about 200,000 and outer plastomeric blocks of polystyrene comprising from about 10 to about 55 weight percent of a total of 100 weight percent of the star-shaped block copolymer, more preferably from about 5 to about 30 parts by weight of a block copolymer selected from the group consisting of linear triblock copolymers wherein the elastomeric polyisobutylene midblock has a number average molecular weight of from about 35,000 to about 100,00 and the two plastomeric endblocks of polystyrene comprising from about 5 to about 50 weight percent of a total of 100 weight percent of the linear triblock copolymer and star-shaped block copolymers having three arms comprising inner elastomeric blocks of polyisobutylene with a number average molecular weight of from about 35,000 to about 100,000 and outer plastomeric blocks of polystyrene comprising from about 10 to about 55 weight percent of a total of 100 weight percent of the star-shaped block copolymer, from about 30 to about 90 parts by weight of carbon black and cure active agents. A vulcanizate derived from such a composition is suitable for use in the production of a rubber membrane material. Uses of such a membrane material may include, but are not limited to, pneumatic tire liners, aerosol spray can linings and air bladders used in soccer balls, footballs, basketballs, volleyballs, air mattresses and tennis balls.

According to yet other preferred embodiments of the present invention a process for producing a vulcanizate having reduced permeability to a gases and improved tear strength comprises:

(A) mixing from about 95 to about 70 parts by weight of one rubbery polymer selected from the group consisting of butyl rubber, chlorinated butyl rubber and brominated butyl rubber, more preferably from about 95 to about 70 parts by weight of brominated butyl rubber, from about 5 to about 30 parts by weight of a block copolymer selected from the group consisting of linear triblock copolymers comprising an elastomeric midblock of polyisobutylene having a number average molecular weight of from about 10,000 to about 200,000 and a molecular weight distribution of from about 1.05 to about 1.6 and two plastomeric endblocks of polystyrene comprising from about 5 to about 50 weight percent of a total of 100 weight percent of the linear triblock copolymer and star-shaped block copolymers having from three to six arms comprising inner elastomeric blocks of polyisobutylene and outer plastomeric blocks of polystyrene comprising from about 10 to about 55 weight percent of a total of 100 weight percent of the star-shaped block copolymer, more preferably from about 5 to about 30 parts by weight of a block copolymer selected from the group consisting of linear triblock copolymers wherein the elastomeric polyisobutylene midblock has a number average molecular weight of from about 35,000 to about 100,000 and the two plastomeric endblocks of polystyrene comprising from about 5 to about 50 weight percent of a total of 100 weight percent of the linear triblock copolymer and star-shaped block copolymers having three arms comprising inner elastomeric blocks of polyisobutylene with a number average molecular weight of from about 35,000 to about 100,000 and outer plastomeric blocks of polystyrene comprising from about 10 to about 55 weight percent of a total of 100 weight percent of the star-shaped block copolymer, from about 30 to about 90 parts by weight of carbon black and cure active agents, (B) forming the mixture produced in (A) into a sheet, and (C) vulcanizing the sheet formed in (B) at a temperature of from about 150° to about 200° C. for from about 5 to about 60 minutes.

The following examples illustrate the present invention and are not intended to limit the scope thereof. All parts are parts by weight unless otherwise specified. The commercial materials used were:

Butyl rubber—product sold as POLYSAR ®Butyl 301,
Brominated butyl rubber—product sold as POLYSAR ®Bromobutyl 2030,
Linear polystyrene-polybutadiene-polystyrene triblock copolymer wherein the polybutadiene block is hydrogenated-commercial product sold as KRATON ®G1650 by Shell,
Carbon black—N-660 type,
Tetramethylthiuram disulphide (TMTD), spider sulphur, stearic acid and zinc oxide.

The properties of the three experimental polyisobutylene-polystyrene block copolymers used in the compositions of the present invention are summarized in Table 1.

EXAMPLE 1

Thirteen butyl rubber compounds were prepared according to the general recipe in Table II. Compounding was carried out in a Brabender internal mixer at a temperature of 100° C. and the mixing cycle was completed in four minutes. The compounded stock was sheeted on a two-roll rubbermill at 40° C. The modulus at 100 percent, 200 percent and 300 percent elongation of each of these raw polymer compounds was then determined according to ASTM D 412-80 and the results are shown in Table III.

Thirteen bromobutyl rubber compounds were prepared by the aforementioned procedure according to the recipe shown in Table II with the exception that POLYSAR®Bromobutyl 2030 was used in place of POLYSAR®Butyl 301. These compounds were also tested in a similar manner to the butyl compounds and the results are given in Table IV.

The running die swell of four of the aforementioned butyl rubber components and four of the aforementioned bromobutyl rubber compounds was also determined using the Monsanto Processability tester and the results are given in Table V. In this test procedure a sample of the rubber compound (12 to 14 grams) is placed in the heated barrel of the instrument and the downward movement of the heated piston forces the sample to extrude through a capillary tube at the bottom of the barrel. On exiting the capillary tube, the extrudate passes a laser scanning device which scans and reports the diameter of the extrudate as a calculated percentage of the capillary size. By the selection of the appropriate capillary die geometry and piston speed, a variety of shear rates that simulate factory processes may be obtained.

From the results shown in Tables III and IV, it can be seen that the modulus values of the rubber compounds increase with increasing block copolymer content. The increase in modulus value is the least pronounced when the block copolymer is the linear polystyrene-polyisobutylene-polystyrene triblock copolymer wherein the number average molecular weight of the polyisobutylene midblock is 42,300 and is the most pronounced when the block copolymer is the star-shaped block copolymer with three polyisobutylene-polystyrene arms.

From the results shown in Table V it can be seen that there is a gradual improvement in the running die swell as the amount of the block copolymer, either the star-shaped block copolymer with polyisobutylene-polystyrene arms in the case of the butyl rubber compounds or the linear polystyrene-polyisobutylene-polystyrene triblock copolymer wherein the number average molecular weight of the polyisobutylene midblock is 42,300, in the rubber compound is increased; the improvement being most marked when the amount of the block copolymer is of the order of 26 weight percent.

EXAMPLE 2

Thirteen butyl rubber compounds were prepared according to the general recipe shown in Table VI. In the first stage of the compounding procedure, the butyl rubber, the block copolymer, the carbon black and the stearic acid were compounded in a Brabender internal mixer at a temperature of 100° C. and the mixing cycle was completed in four minutes. In the second stage, the spider sulphur, the tetramethylthiuram disulphide and the zinc oxide were added on a two roll rubber mill at 40° C. The compounded stock was formed into sheets and vulcanized for 40 minutes at 160° C.

Tensile strength, modulus at 100 percent and 300 percent elongation and ultimate elongation to break were determined according to ASTM D412-80. Hardness was determined using a Type A Shore durometer according to ASTM D2240-81. Tear strength was determined according to ASTM D624-81. De Mattia cut growth of 300 percent and 600 percent was determined according to ASTM-D813.

The air impermeability of the vulcanizates was determined according to the following procedure. A vulcanized rubber sheet was placed into a permeability test cell at which point a positive gas pressure of 50 psi was applied to one side of the sheet. The test cell was then preconditioned for 24 hours at room temperature to allow the system to establish an equilibrium prior to actual testing, after which the test cell was mounted in a constant temperature bath at 65° C. The gas permeating the specimen displaced a liquid from a graduated capillary tube, permitting a direct measurement of the volume. Accordingly, the reported value for air impermeability represents the volume of air passing, per second, through a specimen of 1 $cm^2$ area and 1 cm thickness when the difference in pressure across the specimen is one atmosphere.

The actual compounds used and test results on the vulcanizates are provided in Table VII. Samples 36, 37 and 38 are control formulations containing 7.0, 13.8 and 26.5 weight percent respectively of the block copolymer KRATON® G1650 and sample 39 is a control formulation that does not contain any block copolymer. The test results indicate that the introduction of each of the three polyisobutylene-polystyrene block copolymers at various concentration levels into a butyl rubber composition resulted in a considerable improvement in the tear strength of the vulcanizate relative to that of the rubber composition which did not contain any block copolymer and that the vulcanizates of butyl rubber compositions into which KRATON® G1650 had been introduced at various concentration levels exhibited tear strengths that were only marginally better than that of the rubber composition which did not contain any KRATON® G1650. Similarly, introduction of each of the three polyisobutylene-polystyrene block copolymers at various concentration levels into a butyl rubber composition resulted in an improvement in air impermeability of the vulcanizate relative to that of the butyl rubber composition which did not contain any block copolymer. In contrast, introduction of KRATON® G1650 at various concentration levels into a butyl rubber composition resulted in a significant deterioration of the air impermeability of the vulcanizate relative to that of the butyl rubber composition which did not contain any KRATON® G1650.

EXAMPLE 3

Using the compounding procedure described in Example 2, thirteen bromobutyl rubber compositions were prepared according to the general recipe shown in Table VI.

The resulting vulcanizates were tested for tensile properties, hardness, air permeability and De Mattia cut growth properties as described previously.

Static peel adhesion of the vulcanizates was tested using a modified version of the Pirelli Peel Test. In this procedure, a small slab of rubber compound to be tested is placed in face to face contact with a similar slab of control rubber compound, with a small teflon interface. Fabric layers are placed on both remote surfaces, and the assembly is cured, by heating for 30 minutes at 166° C. Then the force per unit-width required to pull the components apart at their mutual interface is measured at 100° C. and reported, in kilo Newtons per meter. When the adhesion is high, the separation sometimes occurs by tearing within the body of the rubber slabs under test. This is referred to as "stock tear", and represents a maximum value for the adhesion. In the present case, the control rubber compound against which the test compounds were cured was a natural rubber compound, representative of truck tire carcass compounds.

The results of these tests are provided in Table VIII. Samples 49, 50 and 51 are control formulations containing 7.0, 13.8 and 26.5 weight percent respectively of the block copolymer KRATON ®G1650 and Sample 52 is a control formulation that does not contain any block copolymer. These test results indicate that together with an improvement in air impermeability and in tear strength, there also exists a desirable balance of other physical properties. While not wishing to be bound by any theories, it is believed that the improvement in the cut growth properties determined according to the De Mattia test is due to the fact that the polyisobutylene blocks of the block copolymer function as a non-migrating plasticizer in the rubber compounds.

TABLE 1

| Block & Structure | (PIB[1])$M_n$ | (PIB)$M_w M_n$ | PS[2] wt. % |
|---|---|---|---|
| Linear triblock A | 75,000 | 1.12 | 23.9 |
| Linear triblock B | 42,300 | 1.12 | 37.1 |
| Star-shaped block C | 59,000[3] | 1.16 | 35.3 |

PIB[1] - polyisobutylene
PS[2] - polystyrene
[3] - The $M_n$ of the star-shaped PIB block is the $M_n$ of the three PIB arms as a unit, not the $M_n$ of each individual PIB arm in the star.

Table VI 100 parts POLYSAR ® Butyl 301 + block copolymer[1]
50 parts carbon black
3 parts zinc oxide
1 part stearic acid
1 part tetramethylthiuram disulphide
1.75 parts spider sulphur 100 parts POLYSAR ® Bromobutyl 2030 + block copolymer[1]
50 parts carbon black
5 parts zinc oxide
1 part stearic acid

[1] In determining the amount of the curatives to be used in the compounding recipe the total amount of the butyl rubber or the halogenated butyl rubber and the polyisobutylene content of the block copolymer not the total amount of the butyl rubber, the halogenated butyl rubber and the total amount of the block copolymer is taken into consideration.

TABLE II

| Sample # | 1 | 2 | 3 | 4 | 5 | 6 | 7 | 8 | 9 | 10 | 11 | 12 | 13[1] |
|---|---|---|---|---|---|---|---|---|---|---|---|---|---|
| Linear Triblock A | 6.5 | 13.0 | 23.0 | — | — | — | — | — | — | — | — | — | — |
| Linear Triblock B | — | — | — | 8.0 | 15.0 | 29.0 | — | — | — | — | — | — | — |
| Star-shaped Block C | — | — | — | — | — | — | 7.5 | 14.5 | 27.5 | — | — | — | — |
| KRATON ® G 1650 | — | — | — | — | — | — | — | — | — | 7.0 | 14.0 | 27.0 | — |
| POLYSAR ® Butyl 301 | 93.5 | 87.0 | 77.0 | 92.0 | 85.0 | 71.0 | 92.5 | 85.5 | 72.5 | 93.0 | 86.0 | 73.0 | 100 |

13[1] - control sample

TABLE III

| Sample # Compound Property | 1 | 2 | 3 | 4 | 5 | 6 | 7 | 8 | 9 | 10 | 11 | 12 | 13[1] |
|---|---|---|---|---|---|---|---|---|---|---|---|---|---|
| 100% Modulus MPa | 0.36 | 0.38 | 0.44 | 0.38 | 0.44 | 0.62 | 0.36 | 0.42 | 0.54 | 0.35 | 0.40 | 0.54 | 0.28 |
| 200% Modulus MPa | 0.45 | 0.46 | 0.54 | 0.44 | 0.50 | 0.69 | 0.42 | 0.52 | 0.56 | 0.40 | 0.46 | 0.59 | 0.34 |
| 300% Modulus MPa | 0.47 | 0.52 | 0.59 | 0.45 | 0.51 | 0.71 | 0.44 | 0.52 | 0.53 | 0.40 | 0.46 | 0.59 | 0.35 |

13[1] - control sample

TABLE IV

| Sample # Compound Property | 14 | 15 | 16 | 17 | 18 | 19 | 20 | 21 | 22 | 23 | 24 | 25 | 26[2] |
|---|---|---|---|---|---|---|---|---|---|---|---|---|---|
| 100% Modulus MPa | 0.28 | 0.36 | 0.39 | 0.56 | 0.35 | 0.38 | 0.32 | 0.38 | 0.49 | 0.35 | 0.40 | 0.51 | 0.27 |
| 200% Modulus MPa | 0.34 | 0.40 | 0.43 | 0.41 | 0.39 | 0.46 | 0.39 | 0.47 | 0.68 | 0.41 | 0.43 | 0.48 | 0.32 |
| 300% Modulus MPa | 0.34 | 0.42 | 0.42 | 0.42 | 0.39 | 0.48 | 0.39 | 0.49 | 0.77 | 0.40 | 0.40 | 0.43 | 0.32 |

26[2] - control sample

TABLE V

| Sample # Log (Shear rate sec$^{-1}$) | 7 | 8 | 9 | 13[1] | 17 | 18 | 19 | 26[2] |
|---|---|---|---|---|---|---|---|---|
| | | | | Running Die Swell (%) | | | | |
| 1.99 | 12.1 | 11.6 | 12.8 | 13.5 | — | — | — | — |
| 2.48 | 15.2 | 14.0 | 13.7 | 17.2 | 15.9 | 16.5 | 15.3 | 17.4 |
| 3.00 | 27.5 | 24.9 | 21.0 | 29.8 | 21.8 | 24.5 | 21.0 | 27.0 |
| 3.48 | 46.4 | 44.5 | 22.8 | 48.9 | 32.6 | 34.1 | 29.3 | 40.8 |
| 4.00 | — | — | — | — | 38.8 | 36.6 | 33.0 | 44.6 |

13[1] - control sample
26[2] - control sample

TABLE VII

| Sample Number | 27 | 28 | 29 | 30 | 31 | 32 | 33 | 34 | 35 | 36 | 37 | 38 | 39[1] |
|---|---|---|---|---|---|---|---|---|---|---|---|---|---|
| Block Copolymer | Linear Triblock A | | | Linear Triblock B | | | Star-shaped Block C | | | KRATON ® G1650 | | | — |
| Block Content [wt. %] | 6.5 | 12.8 | 23.4 | 7.8 | 15.1 | 28.6 | 7.4 | 14.5 | 27.5 | 7.0 | 13.8 | 26.5 | 0 |
| VULCANIZATE PROPERTY | | | | | | | | | | | | | |
| Hardness, Shore A | 62 | 62 | 62 | 64 | 64 | 63 | 63 | 63 | 70 | 61 | 63 | 65 | 57 |
| 100% Modulus MPa | 2.2 | 1.9 | 1.9 | 2.1 | 2.3 | 2.4 | 2.3 | 2.3 | 3.0 | 2.5 | 2.7 | 3.1 | 2.2 |
| 300% Modulus MPa | 8.0 | 7.9 | 8.2 | 8.1 | 9.5 | 10.9 | 8.3 | 9.0 | 9.8 | 8.9 | 9.5 | 10.9 | 8.2 |
| Tensile Strength | 14.8 | 14.7 | 14.2 | 13.3 | 13.4 | 13.3 | 13.6 | 13.9 | 13.8 | 13.7 | 14.4 | 14.6 | 14.1 |

TABLE VII-continued

| Sample Number | 27 | 28 | 29 | 30 | 31 | 32 | 33 | 34 | 35 | 36 | 37 | 38 | 39[1] |
|---|---|---|---|---|---|---|---|---|---|---|---|---|---|
| MPa | | | | | | | | | | | | | |
| Elongation % | 540 | 550 | 520 | 490 | 480 | 430 | 510 | 500 | 480 | 460 | 490 | 450 | 490 |
| Permeability at air at 65° C., × 10$^{-8}$ | 2.2 | 2.1 | 2.1 | 2.1 | 2.1 | 2.1 | 2.3 | 2.2 | 2.1 | 2.5 | 3.4 | 4.6 | 2.4 |
| Tear Strength at room temp., kN/m | 8.7 | 8.5 | 10.6 | 7.8 | 8.7 | 8.9 | 10.5 | 4.3 | 7.5 | 4.7 | 4.5 | 5.0 | 4.1 |
| De Mattia Flex Test (unaged) | | | | | | | | | | | | | |
| 300% Crack Growth (kc) | 3 | 5 | 24 | — | 5 | 21 | — | — | — | — | — | — | 1 |
| 600% Crack Growth (kc) | 7 | 19 | 76 | — | 18 | 77 | — | — | — | — | — | — | 2 |

39[1] - Control Sample

TABLE VIII

| Sample Number | 40 | 41 | 42 | 43 | 44 | 45 | 46 | 47 | 48 | 49 | 50 | 51 | 52[1] |
|---|---|---|---|---|---|---|---|---|---|---|---|---|---|
| Block Copolymer | Linear Triblock A | | | Linear Triblock B | | | Star-shaped Block C | | | KRATON ® G1650 | | | — |
| Block Content [wt. %] | 6.5 | 12.8 | 23.4 | 7.8 | 15.1 | 28.6 | 7.4 | 14.5 | 27.5 | 7.0 | 13.8 | 26.5 | 0 |
| VULCANIZATE PROPERTY | | | | | | | | | | | | | |
| Hardness, Shore A | 56 | 55 | 55 | 56 | 55 | 52 | 55 | 56 | 68 | 58 | 56 | 64 | 56 |
| 100% Modulus MPa | 1.7 | 1.7 | 1.7 | 1.6 | 1.5 | 1.3 | 1.6 | 1.7 | 1.8 | 1.7 | 1.9 | 2.0 | 1.7 |
| 300% Modulus MPa | 8.3 | 8.3 | 9.0 | 7.5 | 7.2 | 6.8 | 7.8 | 8.5 | 9.9 | 8.2 | 8.8 | 9.1 | 7.9 |
| Tensile Strength MPa | 13.7 | 13.7 | 12.9 | 12.7 | 13.2 | 12.7 | 14.3 | 14.3 | 14.7 | 14.5 | 14.3 | 14.5 | 13.7 |
| Elongation % | 460 | 470 | 420 | 460 | 510 | 490 | 500 | 470 | 470 | 470 | 440 | 430 | 470 |
| Permeability at air at 65° C., × 10$^{-8}$ | 2.2 | 2.2 | 2.0 | 2.5 | 1.8 | 2.0 | 2.1 | 2.1 | 1.7 | 2.6 | 3.0 | 4.3 | 2.7 |
| Static Peel Adhesion at 100° C., kN/m | 9.8 | 7.3 | 5.6 | 10.1 | 9.0 | 5.0 | 11.5 | 9.5 | 6.0 | 11.5 | 6.0 | 4.5 | 12.8 |
| Tear Strength at room temp., kN/m | 7.5 | 5.5 | 7.5 | 6.2 | 12.5 | 11.5 | 12.0 | 11.0 | 10.5 | 11.5 | 9.5 | 9.5 | 6.0 |
| De Mattia Flex Test (unaged) | | | | | | | | | | | | | |
| 300% Crack Growth (kc) | — | — | — | 102 | 170 | >250 | — | — | — | — | — | — | 14 |
| 600% Crack Growth (kc) | — | — | — | 250 | >250 | >250 | — | — | — | — | — | — | 43 |

52[1] - Control Sample

What is claimed is:

1. An elastomeric polymer composition that has improved processability and green strength comprising: from about 95 to about 70 parts by weight of one rubbery polymer selected from the group consisting of butyl rubber, chlorinated butyl rubber and brominated butyl rubber, and from about 5 to about 30 parts by weight of a block copolymer selected from the group consisting of linear triblock copolymers having an elastomeric midblock of polyisobutylene with a number average molecular weight of from about 10,000 to about 200,000 and a molecular weight distribution of from about 1.05 to about 1.6 and two plastomeric endblocks which are polymers of at least one $C_8$ to $C_{12}$ monovinylidene aromatic monomer which may be substituted with at least one $C_1$ to $C_4$ alkyl group or a chlorine or bromine atom on the aromatic ring comprising from about 5 to about 50 weight percent of the linear triblock copolymer and star-shaped block copolymers having from three to six arms wherein the arms have inner elastomeric blocks of polyisobutylene with a number average molecular weight of from about 10,000 to about 200,000 and outer plastomeric blocks which are polymers of at least one $C_8$ to $C_{12}$ monovinylidene aromatic monomer which may be substituted with at least one $C_1$ to $C_4$ alkyl group or a chlorine or a bromine atom on the aromatic ring comprising from about 10 to about 55 weight percent of the star-shaped block copolymer for a total of 100 parts by weight of the rubbery polymer and the block copolymer.

2. The composition of claim 1 wherein the block copolymer is selected from the group consisting of linear triblock copolymers wherein the two plastomeric endblocks are polystyrene and star-shaped block copolymers having from three to six arms wherein the outer plastomeric blocks are polystyrene.

3. The composition of claim 2 wherein the linear triblock copolymer has an elastomeric polyisobutylene midblock with a number average molecular weight of from about 35,000 to about 100,000.

4. The composition of claim 2 wherein the star-shaped block copolymer has three arms and the inner polyisobutylene blocks have a number average molecular weight of from about 35,000 to about 100,000.

5. The composition of claim 3 which further contains at least one type of cure active agent and from about 30 to about 90 parts by weight of at least one type of carbon black.

6. The composition of claim 4 which further contains at least one type of cure active agent and from about 30 to about 90 parts by weight of at least one type of carbon black.

7. The composition of claim 5 wherein the rubbery polymer is brominated butyl rubber.

8. The composition of claim 6 wherein the rubbery polymer is brominated butyl rubber.

9. Vulcanizates of the composition of claim 7.

10. Vulcanizates of the composition of claim 8.

* * * * *